United States Patent [19]
Medlock et al.
[11] 3,989,110
[45] Nov. 2, 1976

[54] GREEN ONION HARVESTER

[76] Inventors: Harold Gene Medlock, P.O. Box 8, Pasco, Wash. 99301; Herman Frank Ragsdale, 176 Sherwood Drive, Salinas, Calif. 93901

[22] Filed: Nov. 25, 1974

[21] Appl. No.: 524,421

[52] U.S. Cl. .......... 171/28; 171/61
[51] Int. Cl.² .......... A01D 27/00
[58] Field of Search .......... 171/61, 62, 50, 51, 171/38, 94, 28, 14, 25; 56/327 R

[56] References Cited

UNITED STATES PATENTS

| | | | |
|---|---|---|---|
| 2,124,309 | 7/1938 | Munsterman | 171/25 |
| 2,792,864 | 5/1957 | Krier et al. | 171/61 X |
| 3,693,721 | 9/1972 | Arnold et al. | 171/61 |

*Primary Examiner*—Russell R. Kinsey
*Attorney, Agent, or Firm*—Cahill, Sutton & Thomas

[57] ABSTRACT

A green onion harvester is disclosed, which harvester includes a plurality of means for grasping the foliage, severing the roots, withdrawing the green onions from the soil, sorting out undersized green onions, removing the lower leaves, and depositing the green onions in a collection bin.

6 Claims, 8 Drawing Figures

5
5
90
60
92
93
91
2
6
3
70
36
18'
18
2
8
4
5
1
43
40
16'
16
14
13
12
15'
11
10
15
30
2

41
40
36
25
42
43
16
19
18
24
21
34
10
15
20
22
17
11
4
4
30
23

77
78
79
76
74
73
70
71
72
105
6
6
75
41
44
36
45
80
37
42
107
92
91
65'
103
100
101
38
39
47
43
46
54
58
52
51
56
53
55
57
64'
61
60
63
62
65
64
50

70
111
107
112
106
105
110
109
102
5
100
108
20

GREEN ONION HARVESTER

The present invention relates to harvesting apparatus, and, more particularly, to green onion harvesters.

For many years many attempts have been made to minimize the need for manual labor in harvesting crops of various types. To date, the only mechanized harvesters which are both practical, effective and efficient are those pertaining to grain crops. Vegetable crops and the like are normally not commercially readily harvestable by machinery because of the multiple operations which must be performed and the non-uniformity of the product within any given crop. Hence, the harvesting of vegetable crops is generally performed by manual labor despite the increasing unavailability of low cost itinerant farm labor and even though various machines have been developed, as exemplified by the following patents: U.S. Pat. No. 1,572,499 is directed to a beet topper; U.S. Pat. No. 2,124,309 is directed to a dry onion harvester; U.S. Pat. No. 2,940,528 is directed to harvesting bush-type plants; U.S. Pat. No. 2,953,209 is directed to a leaf stripping attachment for a sweet potato digger; U.S. Pat. No. 3,552,398 is directed to a cucumber harvester; U.S. Pat. No. 3,613,797 is directed to a peanut digger; U.S. Pat. No. 3,527,304 is directed to a harvester for vine crops; U.S. Pat. No. 3,597,909 is directed to a dry onion harvester; and, U.S. Pat. No. 3,690,049 is directed to a broccoli harvester.

A harvester, regardless of the nature of the crop being harvested, must include some means for: (a) grasping the plant; (b) severing the edible part from the chaff; and (c) conveying the edible part to a collection point. Additional functions such as sorting, washing and bundling may also be performed. Although there is basic similarity between harvesters in terms of end result, each harvester must be specially configured to meet the physical configuration and growth pattern of the particular crop to be harvested. Each crop also has certain inherent peculiarities which are distinct from even biologically related crops which must be fully and completely taken into account in constructing a harvester. Further, the crop must be prepared for market in the normal and expected marketable embodiment. Thus, even though there may exist superficial similarities between harvesters for similar crops, each of the harvesters are unique in terms of the apparatus and function performed, as evidenced by the above enumerated patents. The patentable distinction in the harvester art arises not only from the structure claimed but also from the inventive process necessary in comprehensively analyzing the problems at hand to accommodate for variations in size, shape, and growth conditions of the to be harvested crop. Once the analysis has been completed, the machinery must be designed, built, tested and modified to satisfy all unexpected contingencies.

It is therefore a primary object of the present invention to provide apparatus for automated harvesting of green onions.

Another object of the present invention is to provide a means for harvesting rows of serially planted green onions.

Still another object of the present invention is to provide a green onion harvester which permits high density planting with increased growth rate of the green onions.

A further object of the present invention is to provide a harvester for green onions which cleanly removes at least the lowermost leaf.

A yet further object of the present invention is to provide a green onion harvester which withdraws green onions from the ground and conveys them to collection points ready for bundling.

A still yet further object of the present invention is to provide a green onion harvester which does not bruise or discolor the green onions.

These and other objects of the present invention will become apparent to those skilled in the art as the description thereof proceeds.

The present invention may be described with more specificity and clarity with reference to the drawings, in which.

Figure 3:
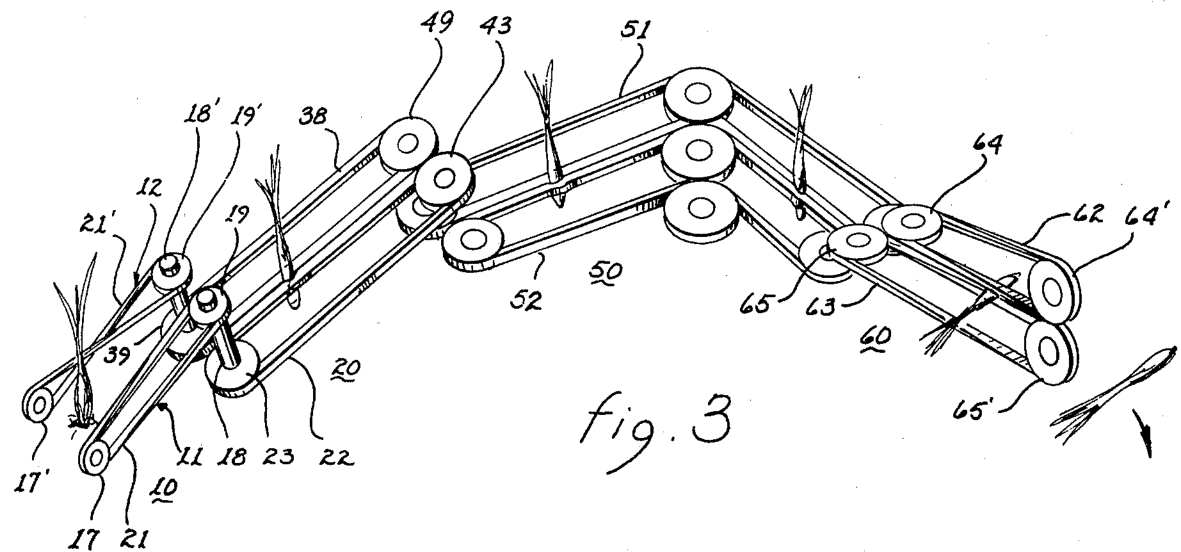

FIG. 3 pictorially illustrates one embodiment for picking up and conveying the green onions.

Figure 2:
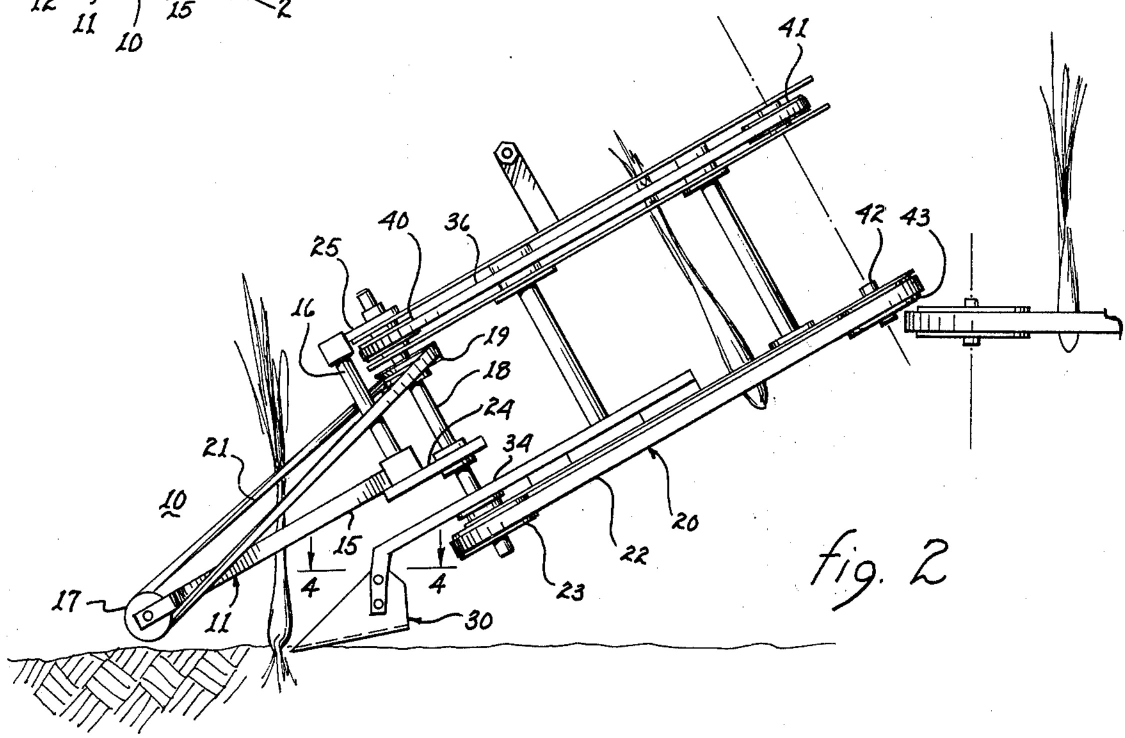
FIG. 2 is an enlarged side view of the green onion pickup assembly taken along lines 2—2, as shown in FIG. 1.
Figure 4:
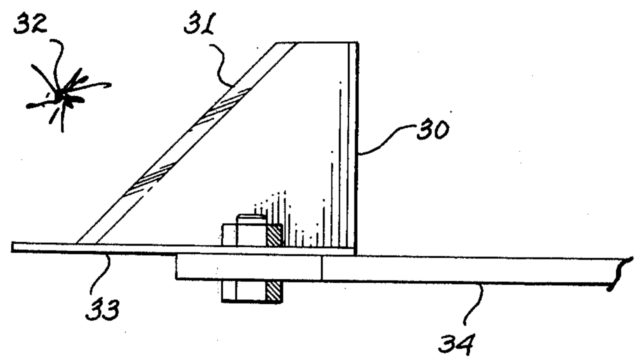

FIG. 4 is an enlarged top view of the root cutting blade taken along lines 4—4, as shown in FIG. 2.

Figure 1:
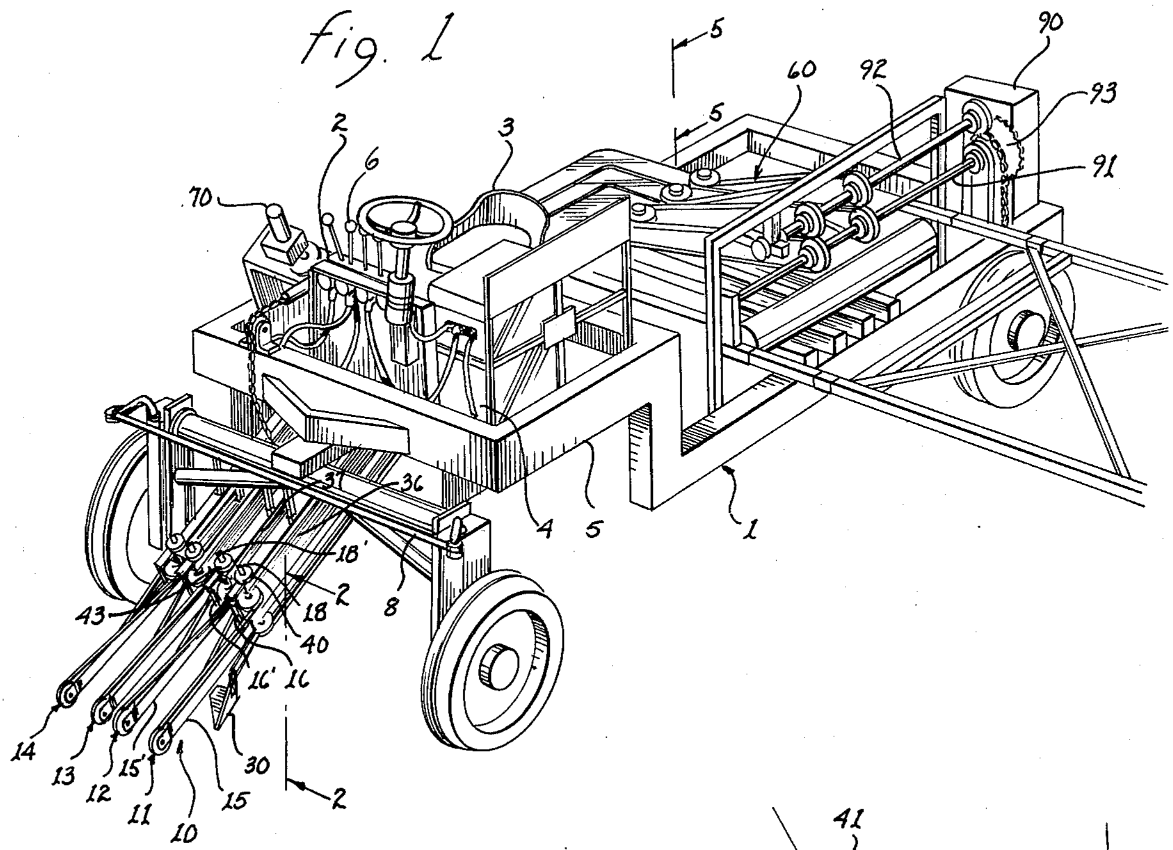
FIG. 1 is a perspective view of the present invention mounted upon a self propelled vehicle.
Figure 5:
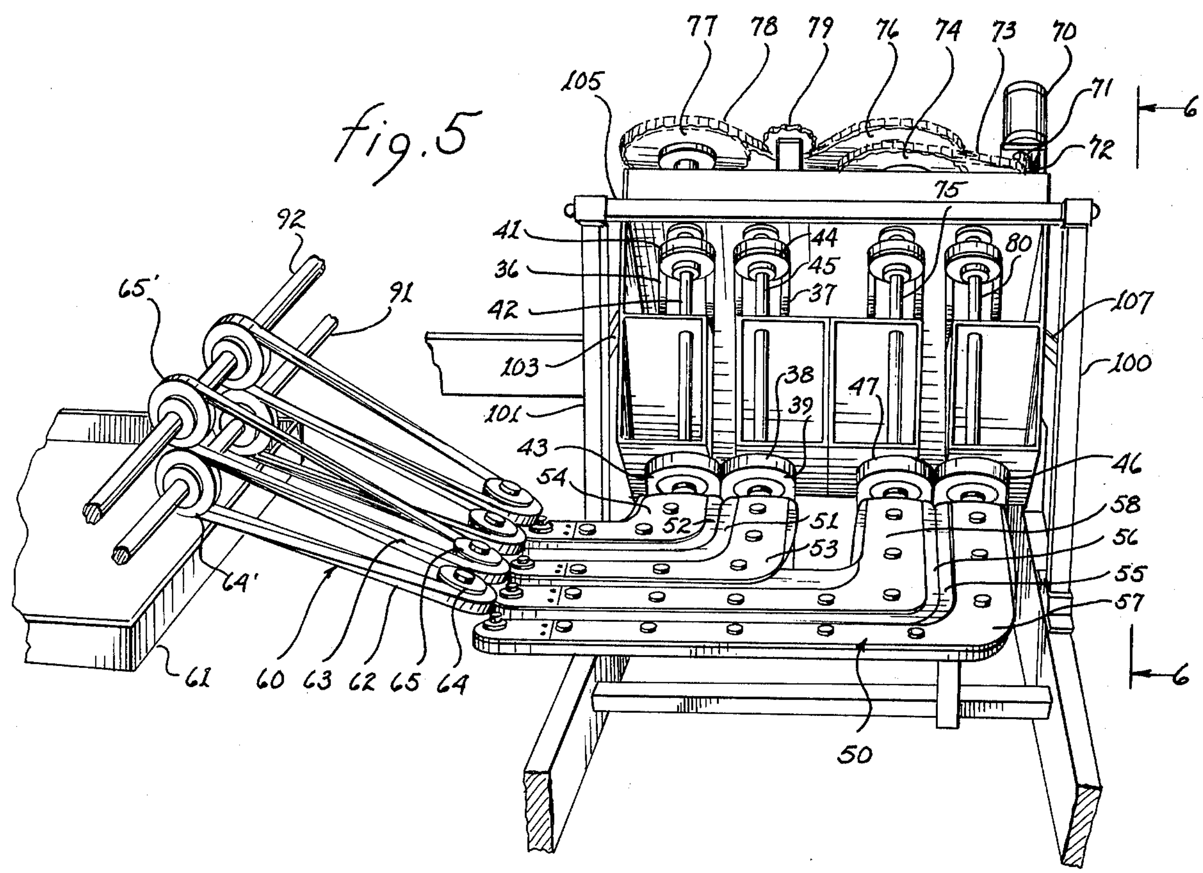

FIG. 5 is an enlarged detailed view of the discrete conveyer assemblies mounted upon the vehicle taken along lines 5—5, as shown in FIG. 1.

Figure 6:
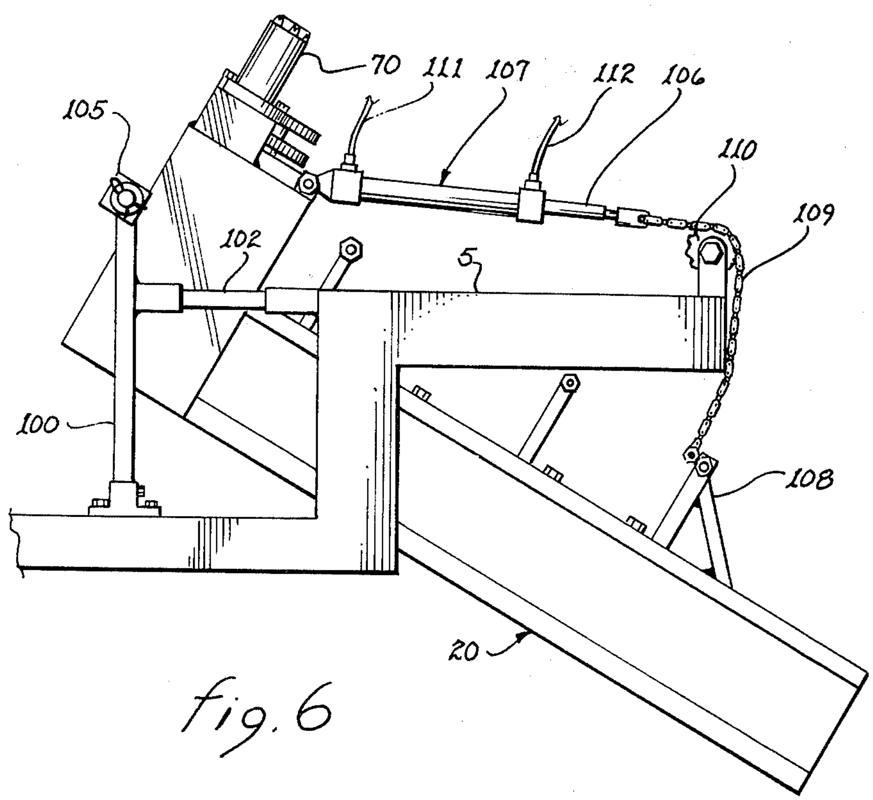

FIG. 6 illustrates, on an enlarged scale, the mechanism for pivoting the first in line conveying assembly to accommodate varying plantings and growth rate of the green onions.

Figure 7:
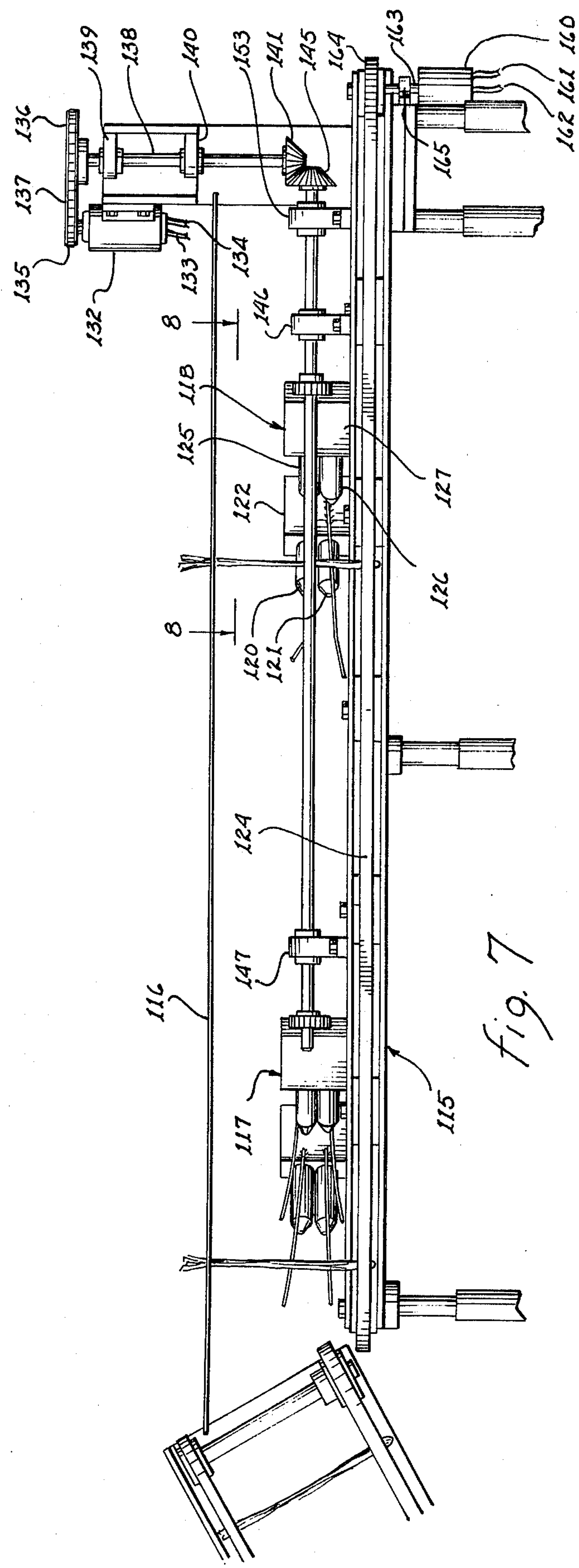

FIG. 7 is a side view of the leaf stripping conveyer assembly utilized in the present invention.

Figure 8:
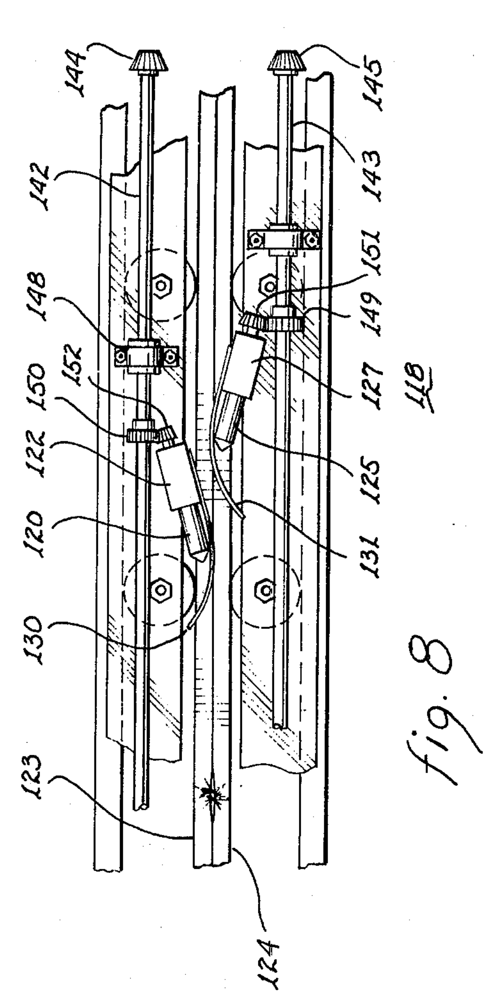

FIG. 8 is a top view of the leaf stripping mechanism taken along lines 8—8, as shown in FIG. 7.

Presently, green onions are planted in 40 inch wide beds having a shallow irrigation channel separating adjacent beds. The green onions are randomly planted in four rows within each bed with a yield of approximately four thousand dozen green onions per acre. The green onions are harvested by hand with some initial sorting being performed in the field. The retained green onions are placed within a box and picked up by a collection truck for final manual de-rooting, sorting, trimming and bundling at a central collection point.

Although the present invention is useable for harvesting green onions planted in the above manner, it permits a different planting method which produces a higher density and yield per acre. That is, in a 40 inch bed, two rows of onions are planted by a precision planter. The green onions within each row are essentially serially aligned with one another and closely spaced to one another. Because of the greater lateral separation between rows which is now possible in the same size bed, the growth rate and final size is not impeded by the close serial spacing. Indeed, the lateral separation between adjacent rows permits increased access to sunlight to promote growth, and weed control can be more effectively carried out. By in field experimentation, it has been determined that the dual row serial planting can provide approximately five thousand dozen green onions per acre at a faster rate of maturity than the prior system of planting.

The green onion harvester of the present invention will be described in further detail with reference to FIG. 1 to particularly point out its mode of operation. The harvester is mounted upon a self propelled vehicle 1. The vehicle includes a console 2 having the necessary controls 6 for propelling and guiding the vehicle, all controls being within easy reach for an operator seated upon seat 3. In addition to the vehicular controls, console 2 includes the necessary controls for operating the harvester apparatus. An internal combustion engine (not shown), acting through suitable transmission and drive shaft means, and the rear wheels, provides the motive means for propelling the vehicle. The internal combustion engine also provides the necessary power to operate a hydraulic fluid pump 4. The hydraulic fluid pump 4 establishes a source of hydraulic fluid under pressure to operate the harvester apparatus. The framework 5 of the vehicle may be tubular, in which case it can serve as a reservoir for the hydraulic fluid. The framework will also tend to cool the hydraulic fluid by having a substantial surface area through which the heat contained by the hydraulic fluid may be dissipated. A high clearance steering mechanism 8 is mounted at the front of vehicle 1 to clear the crop and support the steerable front wheels.

Referring jointly to FIGS. 1, 2 and 3, the pickup assembly 10, which initially and serially engages each green onion, will be described. The pickup assembly 10 includes one or more pairs of arms angled downwardly and forwardly of vehicle 1. Two pairs of arms 11, 12 and 13, 14 are illustrated in FIG. 1, each pair being in alignment with and straddling one of the above discussed rows of green onions. For the sake of simplicity, only a pair of arms 11, 12 are illustrated in FIGS. 2 and 3, it being understood that pair of arms 13, 14 are identical thereto. Each arm is formed by an extendable rod 15 secured to an projecting from a post 16, which post is pivotally connected by brackets 24,25 to a shaft 18 mounted within conveyer assembly 20. A pulley 17 is mounted in the vertical plane at the extremity of rod 15 and pulley 19 is supported orthogonal to pulley 17 by shaft 18. A belt 21 interconnects pulleys 17 and 19. The essentially orthogonal relationship between pulleys 17 and 19 twists the belt 90° from a vertical orientation. Pulley 19 is non-rotatably attached to shaft 18, which shaft is, in turn, rotatably driven by a belt 22 through a further pulley 23. At stated above, arm 12 also includes an adjustable rod 15′ extending forwardly and downwardly from a pivotable post 16′ attached to shaft 18′ to support a pulley 17′ at the lower forward extremity thereof. A pulley 19′, connected to pulley 17′ by a belt 23′, is fixedly mounted upon shaft 18′ with shaft 18′ being rotatably driven by a belt 38 through a pulley 39.

In operation, belt 22 is driven so as to cause clockwise rotational movement of shaft 18 and belt 38 is driven so as to cause counterclockwise rotational movement of shaft 18′. The corresponding rotational movement of pulleys 19 and 19′, in combination with the orientation of belts 21 and 21′ results in the adjacent portions of these belts moving upwardly and toward one another. Arms 11 and 12 being positioned at opposite sides of a row of green onions and moved therealong by forward motion of vehicle 1 in combination with the inward movement of adjacent sections of belts 21 and 21′ tends to cause the belts to grip and guide the foliage of the straddled green onions to a position intermediate pulleys 19 and 19′. Simultaneously, the upward movement of belts 21 and 21′ will tend to raise the gripped green onions from the ground. The angular separation between pairs of arms 11, 12 and 13, 14 is adjustable by brackets extending intermediate pairs of posts 16 and 16′, whereby the degree of compression of the green onion foliage between the adjacent parts of the cooperating belts may be carefully controlled to accommodate the bushiness of the foliage and establish a predetermined gripping force. Further, the vertical position of pulleys 19 and 19′ is adjustable along shafts 18 and 18′by locking collars, respectively, to accommodate the height at which the foliage is to be gripped, which height is dependent upon the type of green onion and the maturity of the crop.

To facilitate removal of the green onions from within the ground, a blade 30 rides underground at approximately one half inch below the green onion bulbs, or at a depth of about 1½ inches. The blade severs the root system of the green onions and also releases the green onions from the clasp of the surrounding earth. The point of contact between blade 30 and the green onion roots is particularly configured to approximately coincide with the position at which the foliage of the green onion becomes firmly clasped between the adjacent sections of belts 21 and 21′ as indicated by FIGS. 2 and 3. Thereby, the green onions will not be severed until they are supported by the belts.

Referring momentarily to FIG. 4, there is illustrated a top view of blade 30. The blade includes an angled cutting edge 31, which edge is approximately centrally oriented with respect to the pertaining row of green onions, as depicted by numeral 32. Blade 30 is adjustably secured to and extends downwardly from the framework of conveyer assembly 20 by means of a flange 33 attached to a positioning arm 34 by a nut and bolt combination. It is anticipated that the position of blade 30 will be varied commensurate with the vertical positioning of pulleys 19 and 19′ and hence the angular orientation of belts 21 and 21′.

A sorting operation is also performed by pickup assembly 10 in that green onions which have insufficient foliage height will not be gripped by belts 21 and 21′ at the point of contact therebetween; or, if the foliage is gripped but too weak to support withdrawal of the green onion, it will not be harvested. Thus, immature or stunted green onions will not be transported to conveyer assembly 20.

Referring now jointly to FIGS. 1, 2, 3 and 5, conveyer assembly 20 will be described in further detail. The conveyer assembly may include one or more sets of conveyer belts, two sets being shown in FIGS. 1 and 5. Each set of conveyer belts includes a pair of adjacent oppositely rotating belts 36 and 37 and a pair of lower adjacent oppositely rotating belts 22 and 38. Belt 36 is retained by pulley 40, which pulley is mounted upon shaft 18 and by pulley 41, which pulley is mounted upon shaft 42. Similarly, belt 37 extends from a pulley 43 mounted upon shaft 18′ and around a pulley 44 mounted upon a shaft 45. The spacing intermediate adjacent portions of belts 36 and 37 is sufficiently narrow to guide the foliage of the green onions but yet wide enough to prevent bruising thereof. Belt 22 is retained by pulley 23, which pulley is mounted upon shaft 18 and by pulley 43, which pulley is mounted on shaft 42. Similarly, belt 38 is retained by pulley 39, which pulley is mounted upon shaft 18′ and by pulley 49, which pulley is mounted on shaft 45. The adjacent portions of lower belts 22 and 38 are essentially in contact with one another. The belts 22 and 38 are either of a very soft sponge rubber composition having a relatively non-stretchable backing, or the belts may have a sponge rubber resilient facing attached to more rigid belts. Although not described in detail, the second set of belts is equivalent to the set described above.

As the green onions are engaged and raised by pairs or arms 11, 12, they are also simultaneously conveyed into proximity of pairs of belts 36, 37 and 22, 38. The stems of the green onions depending from their foliage secured intermediate belts 21 and 21' come into contact with the opposed belts 22 and 38, which contact draws the stem therebetween. The close spacing intermediate adjacent portions of belts 22 and 38 tends to support the stem by slight compression of the belts. The compression must be adjusted by selection of sufficiently resilient belts and/or spacing therebetween to slightly bruise at least the first leaf of the foliage, for reasons which will become apparent. To ensure bruising of the first leaf, there exists a speed differential between belts 22 and 38. The speed differential will tend to cause the green onions to rotate at a rate proportional to the speed differential. Preferably, each green onion will rotate approximately one revolution as it travels through conveyer assembly 20 intermediate belts 22 and 38. Essentially simultaneously, the foliage is released or ejected from between belts 21 and 21' and engaged intermediate belts 36 and 37. These belts do not grip or crush the foliage but serve to guide the foliage as the green onions are conveyed by belts 22 and 38 along the conveyer assembly.

Referring jointly to FIGS. 1, 3 and 5, a first embodiment of the present invention will be described. The receiving end of a conveyer assembly 50 is disposed at the output of conveyer assembly 20 to convey the green onions to a further stage. Conveyer assembly 50 is formed by two pairs of movable belts. A first pair of oppositely rotating belts 51, 52 are mounted upon L-shaped tracks 53 and 54, respectively. Each of tracks 53 and 54 may include a plurality of pulleys or other guide means for directing and regulating the rotation of the respective belts therearound. The L-shaped tracks are sufficiently close to one another such that adjacent portions of belts 51 and 52 are in contact with one another and define an L-shaped path. Pulleys or other guide means are associated with tracks 57 and 58 to adequately guide the respective belts therearound.

The input leg of the L-shaped path of the first pair of belts is in alignment with the out flowing green onions conveyed intermediate belts 22 and 38. Similarly, the input leg of the L-shaped path defined by the second pair of belts is in alignment with the out flowing green onions conveyed intermediate belts 46 and 47. Thus, as the green onions are ejected from conveyer assembly 20, they will come into engagement with the respective pairs of belts of conveyer assembly 50 and will be conveyed thereby.

It will be observed from FIGS. 2, 3 and 5, that conveyer assembly 20 terminates above the input end of conveyer assembly 50. The distance therebetween is approximately commensurate with that of the distance between the gripped stem of the green onions and the green onion bulb. Thus, the green onion bulb will be gripped intermediate the respective pair of belts of conveyer assembly 50. However, it is to be understood that the stem, rather than the bulb, may be gripped by the belts of conveyer assembly 50. It may also be noted that there exists no guide means for the foliage extending upwardly from the green onion bulb. However, guide means, in form of rods or similar elements could be employed. As discussed earlier, conveyer assembly 20 bruises slightly at least the first leaf of the green onions. Without an upper guide mechanism for the foliage, the bruised leaves will tend to droop laterally while the remaining leaves will stand upright. Again, the reason for the drooping lateral leaves will become more apparent in the following discussion.

The speed at which the green onions are conveyed through either pairs of belts in conveyer assembly 50 may be increased above that of conveyer assembly 20. The speed differential between conveyor assemblies 20 and 50 will tend to increase the spacing intermediate adjacent conveyed green onions and thereby ease future handling of the green onions.

Referring jointly to FIGS. 1, 3 and 5, a third conveyer assembly 60 will be described. The purpose of conveyer assembly 60 is that of receiving the green onions from conveyer assembly 50 and placing them upon a receiving tray 61. The green onions can be manually picked and bundled from tray 61 or the tray can be made replaceable so that filled trays can be taken to a central sorting and bundling location.

Conveyer assembly 60 includes sets of paired belts commensurate in number to the number of L-shaped paths of conveyer assembly 50. Each set of belts of conveyer assembly 60 includes a pair of belts 62 and 63 mounted upon pairs of pulleys 64, 64' and 65, 65', respectively. Pulleys 64 and 65 are mounted in the horizontal plane and pulleys 64' and 65' are mounted in a vertical plane. Thereby, the respective belts 62 and 63 are twisted from a horizontal orientation to a vertical orientation. Drive shafts 91 and 92 support pulleys 64' and 65' and impart rotary motion thereto to drive belt 62 counterclockwise and belt 63 clockwise. Adjacent portions of the belts travel in the same direction whereby a green onion lodged therebetween can be transported. The other sets of paired belts operate in a similar manner.

In operation, a green onion conveyed along the L-shaped path defined by belts 55 and 56 and ejected therefrom will be gripped by the adjacent portions of belts 62 and 63. Belts 62 and 63 will grasp the green onion at a point above the bulb as pulleys 64 and 65 are disposed above the exit point of the L-shaped path. As the green onion travels intermediate adjacent portions of belts 62 and 63, its longitudinal axis will be rotated approximately 90° as illustrated in FIG. 3. In proximity to pulleys 64' and 65', the green onions will be ejected from the conveyer assembly 60 and dropped onto tray 61. Because the green onions are essentially horizontal at the moment of ejection from the conveyer assembly 60, the probability of bruising or damaging them is insignificant.

The green onions are manually removed from tray 61 either in the field or at a central location and the laterally drooping bruised leaves are quickly and easily ripped away without leaving a nub which might rot or discolor. Subsequently, the green onions may be washed and bundled for market.

The means for powering or driving the above described belt system will be described with joint reference to FIGS. 1, 5 and 6. A plurality of hydraulic lines extend from hydraulic pump 4 to a hydraulic motor 70, which motor is mounted upon the framework at the upper end of conveyer assembly 20. Hydraulic motor 70 converts the inflowing pressurized hydraulic fluid into rotary motion of an output shaft 71. A sprocket 72 is non-rotatably secured to the output shaft. Sprocket 72, by means of chain 73, drives a further sprocket 74. Sprocket 74 is affixed to the upper part of shaft 75. A second sprocket 76 is also mounted upon shaft 75 to drive a sprocket 77 secured to shaft 42 by means of a chain 78, whereby rotary motion to shaft 42 is imparted. Although not illustrated in detail, additional sprocket and chain assemblies are incorporated to drive shafts 45 and 80. The pulleys fixedly secured to shafts 42, 45, 75 and 80 impart the driving force to the engaged belts. Chain tensioners such as sprocket 79 may be employed to eliminate backlash and provide a smooth constant flow of power.

Referring momentarily to FIG. 2, it may be appreciated that the driving force for the belts of the pickup assembly 10 is derived from the rotation of the shafts (i.e. 18 and 18') of conveyer assembly 20 which engage the belts of the pickup assembly.

A further hydraulic motor is attached to the tubular framework 5 in proximity to conveyer assembly 50. This hydraulic motor also drives at least one of the pulleys associated with each of the belts of conveyer assembly 50 through a series of chains and sprockets. As pointed out above, the gear ratios and/or speed of the hydraulic motors associated with conveyer assembly 50 may be different from that of hydraulic motor 70 in order to space out the green onions conveyed by conveyer assembly 50.

Conveyer assembly 60 is powered by a hydraulic motor 90, as shown in FIG. 1. The hydraulic motor drives shafts 91 and 92 through either a gear box or sprocket and chain mechanism, as represented by numeral 93. Shafts 91 and 92 are non-rotatably connected to pulleys 64' and 65' of one set of paired belts in conveyer assembly 60. The corresponding pulleys of the second or additional sets of belts are similarly connected to shafts 91 and 92. It may be noted that hydraulic motor 90 is independent of the other hydraulic motors driving the conveyer assemblies whereby the rate of movement of conveyer assembly 60 may be individually controlled and regulated.

The size at maturity between different crops of green onions vary as to geographical location, type of green onion and the degree of maturity at time of harvest. Hence, both the size and height of the foliage may be variable from one crop to another. Moreover, the manner in which the green onions are marketed at a particular location has some effect on the manner of harvesting them. In order to accommodate the varying size of green onions and the point at which the green onions are gripped by the harvesting apparatus, conveyer assembly 20 is angularly adjustable. By adjustment, the height at which the belts grip the green onions conveyed by the pickup assembly 10 and the angle and height at which the pickup assembly 10, including blades 30, is oriented may be varied. Some variation in height between the output of conveyer assembly 20 and the input to conveyer assembly 50 can also be effected.

The mechanism for varying the angular position of conveyer assembly 20 will be described with primary reference to FIG. 6 and supplemental reference to FIG. 1. A pair of posts 100 and 101 extend upwardly from the tubular framework 5. These posts may be further supported by braces 102 and 103. The upper end of posts 100 and 101 are pivotally attached to a bar 105, which bar forms a part of the framework of conveyer assembly 20. The ram 106 of a hydraulic cylinder and ram assembly 107 is connected to a bracket 108 by means of a chain 109. The chain is supported by a sprocket 110, which sprocket is rotatably mounted upon the forward end of the tubular framework 5. By injecting and withdrawing hydraulic fluid through hydraulic lines 111 and 112, ram 106 may be selectively contracted to extended to produce a commensurate pivotal movement of conveyer assembly 20. Thereby, the pickup assembly 10 and blades 30 can be raised or lowered on command.

In addition, to accommodate the growth rate and/or point of contact of the harvested green onions, the conveyer assembly 20 can be raised or lowered to accommodate uneven surfaces in the field. Further, the conveyer assembly can be raised to a substantial degree to permit movement of vehicle 1 to and from the field despite uneven roads or other upwardly extending protrusions upon the surface traversed.

Referring to FIG. 7, there is shown an alternate embodiment of the present invention in place of the right angled conveyer assembly 50. Conveyer assembly 115 performs the previously employed manual method of stripping the first, second and/or third leaves from the green onions. The conveyer assembly includes one or more pairs of belts 123, 124 aligned with corresponding pairs of belts of conveyer assembly 20 whereby the green onions ejected from conveyer assembly 20 are gripped by conveyer assembly 115. The adjacent portions of the belts 123, 124 grip the bulbs or stems of the green onions as illustrated and provide the motive force for transporting the green onions. In order to slowly rotate each transported green onion, the adjacent belts 123, 124 travel at a slightly different speed. A plurality of parallel rods 116 are mounted above and in alignment with the path of the transported onions and serve as guides for the upwardly extending foliage. Because the first, second and/or third leaves of each green onion have been previously purposely slightly bruised, these leaves will tend to droop and extend lateral to the generally vertically oriented remaining foliage. The rotation of each green onion, though at a low rate, tends to exert a centrifugal force upon the bruised leaves such that they will extend essentially lateral from the bruise.

A pair of deleafing stations 117 and 118 are mounted upon conveyer assembly 115. These stations are essentially identical to one another and station 118 will be described in further detail with reference to FIGS. 7 and 8. A first pair of oppositely rotating rollers 120, 121 extend from housing 122 disposed at one side of adjacent portions of belts 123 and 124. A second pair of oppositely rotating rollers 125 and 126 extend from housing 127, which housing is mounted at the opposite side of adjacent portions of belts 123 and 124. A pair of splayed leaf guides 130 extend from housing 122 toward the oncoming green onions. A similar pair of splayed leaf guides 131 extend from housing 127 toward the oncoming green onions.

The power means to operate the deleafing apparatus is provided by hydraulic motor 132, which motor is connected to the hydraulic fluid pressure source contained within hydraulic pump 4 (see FIG. 1) by hydraulic lines 133, 134. The output sprocket 135 of hydraulic motor 132 drives a sprocket 136 through a chain 137. Sprocket 136 is mounted upon vertically extending shaft 138, which shaft is supported by pillow blocks 139 and 140. A bevel gear 141 is attached to the lower end of shaft 138 to mate with bevel gear 145 of drive shaft 143. Although not shown in FIG. 8, a second shaft powered by hydraulic motor 132 and similar to shaft 138 drives bevel gear 144 of drive shaft 142. Drive shaft 143 is supported by a plurality of pillow blocks, such as pillow blocks 143, 146 and 147. Similarly, drive shaft 142 is supported by a plurality of pillow blocks, of which pillow block 148 is illustrated in FIG. 9. A drive gear 149 is mounted upon drive shaft 143 to mate with a bevel gear 151 extending from within housing 127. A drive gear 150 is mounted upon drive shaft 142 to drive bevel gear 152 extending from housing 122. Similar drive and bevel gears are incorporated to operate station 117.

Although pairs of rollers are shown to effect the deleafing operation, it is to be understood that oppositely rotating belted surfaces may be employed in their place. Such belted surfaces afford more surface contact with the leaves and tend to minimize premature severing of less than the whole leaf.

The motive means for actuating belts 123 and 124 of conveyer assembly 115 may include a hydraulic motor 160. Hydraulic motor 160 receives and returns a flow of hydraulic fluid through hydraulic lines 161 and 162. A pulley 164, driving belt 124, is secured to output shaft 163, which shaft extends upwardly from hydraulic motor 160 and may be supported by appropriate journaling means. Power take-off means for driving a pulley supporting belt 123 may include a sprocket 165 driving a chain interconnecting the output shaft 163 with the drive shaft for the pulley of belt 123.

The operation of conveyer assembly 115 may be described as follows. The green onions are conveyed upwardly by conveyer assembly 20 until the green onions are grasped by adjacent belts 123, 124. These belts, traveling at slightly different speeds, induce rotation of the gripped green onions. The foliage of the rotating green onions is generally guided by rods 116. However, the Bruised first, second and/or third leaves, being insufficiently rigid to stand upright without support, will tend to droop when they are rotated out of contact with the guide rods. The drooping leaves will be caught by the splayed leaf guides 130 or 131 at either station 117 or 118 and directed toward the counter rotating rollers. The counter rotating rollers engage the drooping leaves and exert a lateral force thereon. The lateral force will rip the leaves from the stem and remove them cleanly without leaving a nub.

The partly deleafed green onions ejected from the conveyer assembly, can be collected in a bin or trough for manual bundling and storage. Alternatively, apparatus for receiving the green onions from conveyer assembly 115 and bundling them may be incorporated within vehicle 1.

Knives or rotary cutters can also be positioned along either conveyer assembly 20, 50 or 115 to top the foliage at a predetermined height. Thereby, one less presently manually performed operation can be carried out by the present invention.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

We claim:

1. A mobile harvester mounted upon a self propelled vehicle for harvesting one or more rows of green onions and including a pickup assembly, a slanted conveyor, a further conveyor and a collection tray, said harvester comprising:

a. said pickup assembly having at least one pair of arms extending downwardly and forwardly of the vehicle for bracketing one of the rows of green onions, said pickup assembly including:

i. a first vertically oriented pulley rotatably mounted at the forward extremity of each arm of said pair of arms;

ii. a second pulley oriented orthogonal to said first pulley and rotatably mounted within the forward end of said slanted conveyer assembly;

iii. a belt extending about said first and second pulleys, said belt being spirally oriented by said first and secon pulleys; and iv. means for driving one belt of said pair of belts in a first direction and the other belt of said pair of belts in another direction; whereby, the spiral orientation of each belt of each said pair of belts produces convergence of said pair of belts to draw the foliage into and between said pair of arms and said pickup assembly serially withdraws the green onions from the soil and transports them upwardy and toward the vehicle;

b. said slanted conveyer assembly being attached to the vehicle in proximity to the front thereof for supporting said arms of said pickup assembly, receiving the vertically oriented green onions from said pickup assembly and transporting them upwardly onto the vehicle while maintaining them vertically oriented, said slanted conveyer assembly including:

i. a plurality of blades attached to said slanted conveyer assembly and extending forwardly of the vehicle, each said blade being in general alignment with a row of green onions and being vertically disposed beneath the bulbs of the green onions for severing the green onion roots and facilitate withdrawal of the green onions from the soil;

ii. a plurality of first and second vertically displaced but axially aligned pairs of belts for receiving the green onions withdrawn by said pickup assembly and discharging the green onions at the end of said slanted conveyer, each of said first and second pairs of belts being mated with one of said pairs of arms;

iii. each of a plurality of pairs of pulleys being rotatably mounted upon said slanted conveyer for supporting said first pair of belts and maintaining portions of said first pair of belts in resiliently yielding contact with one another to receive and retain the stem of the foliage of the green onions transported by the mated ones of said pair of arms at or before discharge of the green onions from said pickup assembly and bruise the base of at least the lowermost leaf forming the foliage;

iv. each of a further plurality of pairs of pulleys being rotatably mounted on said slanted conveyer for supporting said second pair of belts and maintaining said second pair of belts spaced apart from one another to receive and guide the foliage of the green onions released by said pickup assembly while the green onions are gripped and transported by said first pair of belts;

c. a further conveyer assembly for transporting the green onions to a discharge end of said further conveyer while maintaining them vertically oriented, said further conveyer assembly being mounted on the vehicle in proximity to the discharge end of said slanted conveyer assembly and having one set of belts for receiving the vertically oriented green onions transported by each said first and second pair of belts of said slanted conveyer assembly;

d. a collection tray attached to the vehicle in proximity to the discharge end of said further conveyer assembly for receiving the green onions transported by said further conveyer assembly; and e. motive means for energizing the belts of said pickup assembly, said slanted conveyer assembly and said further conveyer assembly.

2. The harvester as set forth in claim 1 wherein said further conveyer assembly includes deleafing means for removing the leaves of the green onions bruised by said slanted conveyer assembly.

3. The harvester as set forth in claim 2 wherein said deleafing means includes:

a. a pair of oppositely rotating roller mechanisms disposed lateral to the path of the green onions transported by said further conveyer assembly;

b. a pair of splayed guides for intercepting the bruised leaves and guiding them toward said roller mechanisms; and c. gear means for driving the belts of said set of belts in said further conveyer assembly at different speeds to impart a rotary motion about the vertical axis of the transported green onions to ensure engagement between said splayed guides and the bruised leaves; whereby, the bruised leaves on engagement with said roller mechanisms are stripped from the green onions.

4. The harvester as set forth in claim 1 wherein said further conveyer assembly includes a pair of L-shaped tracks for guiding each said set of belts to define an L-shaped path in the horizontal plane for the vertically oriented transported green onions; whereby, the green onions are discharged from said further conveyer assembly lateral to the row of harvested green onions.

5. The harvester as set forth in claim 4 including a yet further conveyer assembly for receiving the green onions from said further conveyer assembly and transporting them to said tray, said yet further conveyer assembly including further sets of paired belts for reorienting the transported green onions from a vertical orientation to a horizontal orientation simultaneous with the transport thereof.

6. The harvester as set forth in claim 5 including means for spacing out the green onions transported by said further conveyer assembly in increasing the speed of travel of the green onions in said further conveyer assembly from that of said slanted conveyer assembly.

* * * * *